Feb. 21, 1956     G. BONMARTINI     2,735,727
REDUCING THE FRICTIONAL RESISTANCE BETWEEN BELTS AND PULLEYS
Filed June 6, 1951
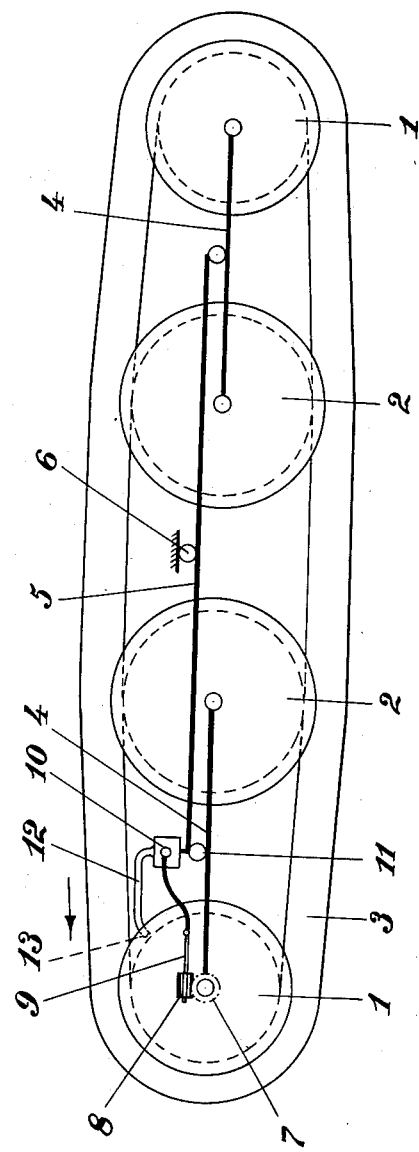
INVENTOR
GIOVANNI BONMARTINI
BY Robert G. Burns
ATTORNEY

United States Patent Office 2,735,727
Patented Feb. 21, 1956

2,735,727
REDUCING THE FRICTIONAL RESISTANCE BETWEEN BELTS AND PULLEYS

Giovanni Bonmartini, Rome, Italy, assignor to "Est" Etablissement Sciences Techniques, Vaduz, Liechtenstein, a company of Liechtenstein Application June 6, 1951, Serial No. 230,199

Claims priority, application Italy April 19, 1951

6 Claims. (Cl. 305—1)

The present invention relates to a method of reducing the frictional resistance between belts and pulleys in general, and particularly between rubber track and pulley wheels in track undercarriages or bogies used in vehicles of any kind, i. e. land vehicles, aircraft and amphibious vehicles.

The invention relates also to a device for carrying out said method.

The problem solved by the present invention is as follows:

When a pulley is coupled to a mechanical flexible and inextensible element (the word "inextensible" is here used in its practical meaning, i. e. in respect to the working conditions) such as a belt or a track, and the elementary machine thus constituted is in operation, the resistances to motion are mainly the following three:

1. Frictional resistance of the pulley on its own support (hub or bearing);
2. Hysteretic resistance of the belt or track due to the deformation suffered by the element in passing from a rectilinear to a curvilinear shape by which the flexible element is adapted to the peripheral curve of the pulley;
3. Frictional resistance between the elemental areas of the belt or of the track when each elemental small area of the contact surface meets and leaves the periphery of the pulley.

The problem of reducing the resistance mentioned in item 1 above has already been considered and satisfactorily solved, and the problem of reducing the hysteretical resistance mentioned in item 2 is related to the material composing the belt or track and its associated structure and is therefore outside the scope of this invention, but the third problem concerning the resistance mentioned in item 3 above, is the one which is solved by the present invention.

The frictional resistance in item 3 above, which will be called hereinafter "winding frictional resistance," and which occurs as the belt reaches and leaves the pulley and also while it is passing over the pulley, also when the belt and pulley only rest one on the other, without the belt being wound round the pulley appreciably, is considerable, and it is therefore useful to provide a means for reducing this frictional resistance.

In the case of belts or tracks running in grooved pulleys, wherein the phenomenon of the winding frictional resistance sometimes reaches considerable values, said frictional resistance tends to cause the flexible element to run off the pulley or sheave. Reduction of this frictional resistance eliminates or considerably reduces this undesirable tendency.

According to the present invention the conditions of frictional resistance between belt or track and pulley, are reduced by using a lubricant.

The simple idea of using a lubricant constitutes a particular improvement which is not obvious to those skilled in the art, and almost unthinkable to them.

None of the rubber tracks or the like hitherto tested for aircraft or land vehicle undercarriages have lubrication, and examples of lubrication between belt or track and pulley in other fields are also unknown. It has been found that the use of such lubrication, although reducing the amount of driving force, leaves a sufficient amount of usable power.

The lubricating means to be used must be such as not to damage the elements coming in mutual contact; particularly, in the case of pneumatic or non-pneumatic rubber tracks, it is advisable to use a liquid lubricant, like castor oil, which does not damage rubber and is not washed away by the humidity of the ground and by rain.

However, non-liquid substances may be used, such as graphite, some soaps, etc.

The foregoing remarks also apply to those pulleys in which the flexible element is maintained in its co-operating position with the pulley by means of auxiliary members, such as defence rollers placed on the side of the track, the contact whereof with said members or rollers causes a detrimental frictional resistance which can be eliminated by lubricating the flexible element at its contact zone.

The lubricant, according to the present invention, is applied by means of a device which may be manually controlled, but preferably it is automatically operated by the rotation of the pulley co-operating with the belt or track.

An embodiment of said device is shown in the accompanying diagrammatic drawing, wherein the figure shows a track mounted on an undercarriage having four pulley wheels, two of which serve for winding the track and the other two serve solely as supports between the track and the undercarriage.

The articulated undercarriage is formed by the end wheels 1 and the intermediate wheels 2. A track 3 runs in the grooves of said pulley wheels and may be, although not necessarily, of the pneumatic type. The rocking levers 4 connect the front wheels 1, 2 and the rear wheels 1, 2. A rocking yoke 5 pivoted at 6 connects the rocking levers 4. The vehicle (for instance an aircraft) bears on the pivot 6. On the hub 7 of the front wheel 1 is mounted a gearing 8 which, through a flexible shaft 9 actuates a castor oil feed device 10. Said feeding device is fixed adjacent an articulation 11 between the rocking lever 4 and the rocking yoke 5. The motion of the front wheel 1 causes lubricant to pass from the feed device 10 through the small tube 12 to the lubricating point 13, i. e. close to the point at which the track, moving in the direction shown by the arrow, contacts the front wheel 1. In this way lubricant is conveyed between the track and the groove of the pulley, and from the internal surface of the track it is carried to the grooves of the remaining pulley wheels, thus ensuring the lubrication of the whole mechanism.

In the example of embodiment diagrammatically shown, the indicated parts may be replaced by other equivalent parts, without departing from the scope of the invention. Also, castor oil has been mentioned, but the feed device 10 may be constructed in a known way or in a way to be determined so as to use any other suitable lubricant, even solid or semi-solid lubricant.

I claim:

1. In a bogie comprising an endless track of rubber-like material and a plurality of grooved pulleys on which said track runs, a lubricant feed device mounted on said bogie adjacent said grooved wheel, driving connections between said wheel and said feed device for actuating the latter and means for discharging lubricant from said feed device onto the periphery of said wheel.

2. In a bogie comprising an endless track of rubber-like material and a plurality of grooved pulleys on which said track runs, a lubricant feed device mounted on said bogie and constructed and arranged to introduce lubricant between said track and the peripheries of said pulleys.

3. In a bogie comprising an endless track of rubber-like material and a plurality of grooved pulleys on which said track runs, a lubricant feed device mounted on said bogie and comprising lubricant-propelling means and means for discharging lubricant on at least one of the interengaging surfaces of the pulleys and track.

4. An endless track bogie comprising a plurality of grooved wheels, an endless track running in the grooves of said wheels, and means associated with said bogie for reducing the tendency of the track to climb out of said grooves comprising means for applying a sufficient amount of lubricating substance between the interengaging surfaces of said track and wheels to partially reduce friction between said interengaging surfaces, the extent of such reduction being insufficient to prevent useful power transfer between said surfaces.

5. An endless track bogie comprising a plurality of axles, grooved wheels mounted for rotation on said axes, a tubular pneumatic track running in the grooves of said wheels, and means associated with said bogie for reducing the tendency of the track to climb out of said grooves comprising means for applying a sufficient amount of lubricating substance between the interengaging surfaces of said track and wheels to partially reduce the friction between said interengaging surfaces, said last mentioned means comprising means controlled by one of said wheels for automatically controlling the application of said lubricating substance.

6. In combination with an aircraft undercarriage; a plurality of axles, grooved wheels mounted for rotation on said axles, an endless pneumatic track running in the grooves of said wheels, and means associated with said undercarriage for reducing the tendency of the track to climb out of said grooves comprising means for applying a sufficient amount of lubricating substance between the interengaging surfaces of said track and wheels at points where said track enters and leaves said grooves to partially reduce the friction between said interengaging surfaces.

References Cited in the file of this patent

UNITED STATES PATENTS 2,575,845     Singer  ----------------- Nov. 20, 1951

FOREIGN PATENTS 383,618     Great Britain ----------- June 10, 1930